United States Patent [19]

Valiga et al.

[11] 4,350,461
[45] Sep. 21, 1982

[54] MULTIPLE WASTE DISPOSAL VAULTS

[75] Inventors: Richard E. Valiga, Center Square; John R. Rosso, Mechanicsburg, both of Pa.

[73] Assignee: Stabatrol Corporation, Norristown, Pa.

[21] Appl. No.: 212,791

[22] Filed: Dec. 3, 1980

[51] Int. Cl.³ .................... B65G 5/00; E02D 31/00
[52] U.S. Cl. ..................................... 405/128; 405/53
[58] Field of Search .................. 405/36, 53, 54, 55, 405/128, 129; 210/170

[56] References Cited

U.S. PATENT DOCUMENTS

| | | | |
|---|---|---|---|
| 3,705,851 | 12/1972 | Brauer | 405/129 X |
| 3,859,799 | 1/1975 | Jaco, Jr. | 405/128 |
| 3,940,940 | 3/1976 | Barrett | 405/54 X |
| 4,166,709 | 9/1979 | Valiga | 405/128 |

FOREIGN PATENT DOCUMENTS 2430371  1/1976  Fed. Rep. of Germany ...... 405/128

Primary Examiner—David H. Corbin
Attorney, Agent, or Firm—Harry B. Keck

[57] ABSTRACT

A compartmentalized waste disposal installation includes multiple disposal vaults, each positioned above a normal high water table level of the region. The vaults are disposed in parallel relationship and are stacked in two or more tiers to provide a compact permanent waste disposal facility. Each individual waste disposal vault provides water-impermeable encapsulation for the waste disposal materials and each individual waste disposal vault is positioned within a basin which has a water-impervious lining and a collection system for recovering leakage or leachate which may develop from each individual waste disposal vault.

8 Claims, 5 Drawing Figures

MULTIPLE WASTE DISPOSAL VAULTS

BACKGROUND OF THE INVENTION

1. Field of the Invention

This invention relates to the disposal of hazardous wastes and more particularly to a compact arrangement of multiple waste disposal vaults.

2. Description of the Prior Art

Permanent waste disposal vaults for hazardous waste materials are described in my U.S. Pat. No. 4,166,709 and my copending U.S. patent application Ser. No. 201,498, filed Oct. 28, 1980. Permanent vaults are there described which include a water-impervious encapsulation of hazardous waste materials at a level above the normal high water table level in the geographical region of the vault. A supplemental water-impervious film may be provided beneath each vault to collect any leakage or leachates from the individual vaults. Each vault, after completion, is covered with indigenous earth material which is graded to correspond to the natural grade of the geographical region of the vault.

Permanent encapsulation of hazardous waste materials contemplates that the materials will be stored, unchanged, in perpetuity.

Providing multiple permanent encapsulation vaults of the prior art may occupy substantial geographical area. Hence it is desirable to reduce the geographical area required for the permanent waste disposal.

There is always a possibility that a permanent waste material disposal vault might become fractured as a result of unforeseen geological phenomena, military action, unintended mechanical penetrations or the like. Any penetration of the encapsulation might permit surface water to penetrate into the hazardous waste contents of the vault and result in leakage or leachate leaving the vault for possible contamination of the ground water. In my copending patent application Ser. No. 201,498, aforesaid, I have provided a water-impervious film for collecting and analyzing the leakage and leachate of any vault and a further means for collecting the leakage and leachate to preclude its entry into the regional water system.

As more and more permanent waste disposal vaults accumulate in a geographical region, it is increasingly important to be able to identify the precise source of any fracture which may be causing leakage or leachate so that the fracture can be repaired.

SUMMARY OF THE INVENTION

According to the present invention I provide multiple waste disposal base vaults which are aligned side-by-side and each provided with its own channel-shaped basin for accumulating the leakage or leachate therefrom. Additional second tier waste disposal vaults are provided in the furrows between the parallel waste disposal base vaults and are equipped with individual collection means for recovering the leakage and leachate therefrom. Additional third tier waste disposal vaults may be provided in the furrows between the parallel second tier waste disposal vaults, each equipped with individual collection means for recovering the leakage and leachate therefrom. A sump is provided for the collection system for each of the waste disposal vaults to permit accumulation and identification of the leakage or leachate. Additional tankage is provided for receiving leakage or leachate in significant quantities if such significant quantities should develop as a result of failure of one or more of the permanent waste disposal vaults.

Accordingly, if there should be a failure in one of many of the compacted permanent waste disposal vaults of the present invention, the appearance of substantial quantities of leakage or leachate in the related sump will inform the facility operator of the failure and will identify the precise location within the vault where the failure occurred because of the chemical analysis of the leachate or leakage which could be traced to the known contents of the particular vault.

DESCRIPTION OF THE PREFERRED EMBODIMENTS

Figure 1:
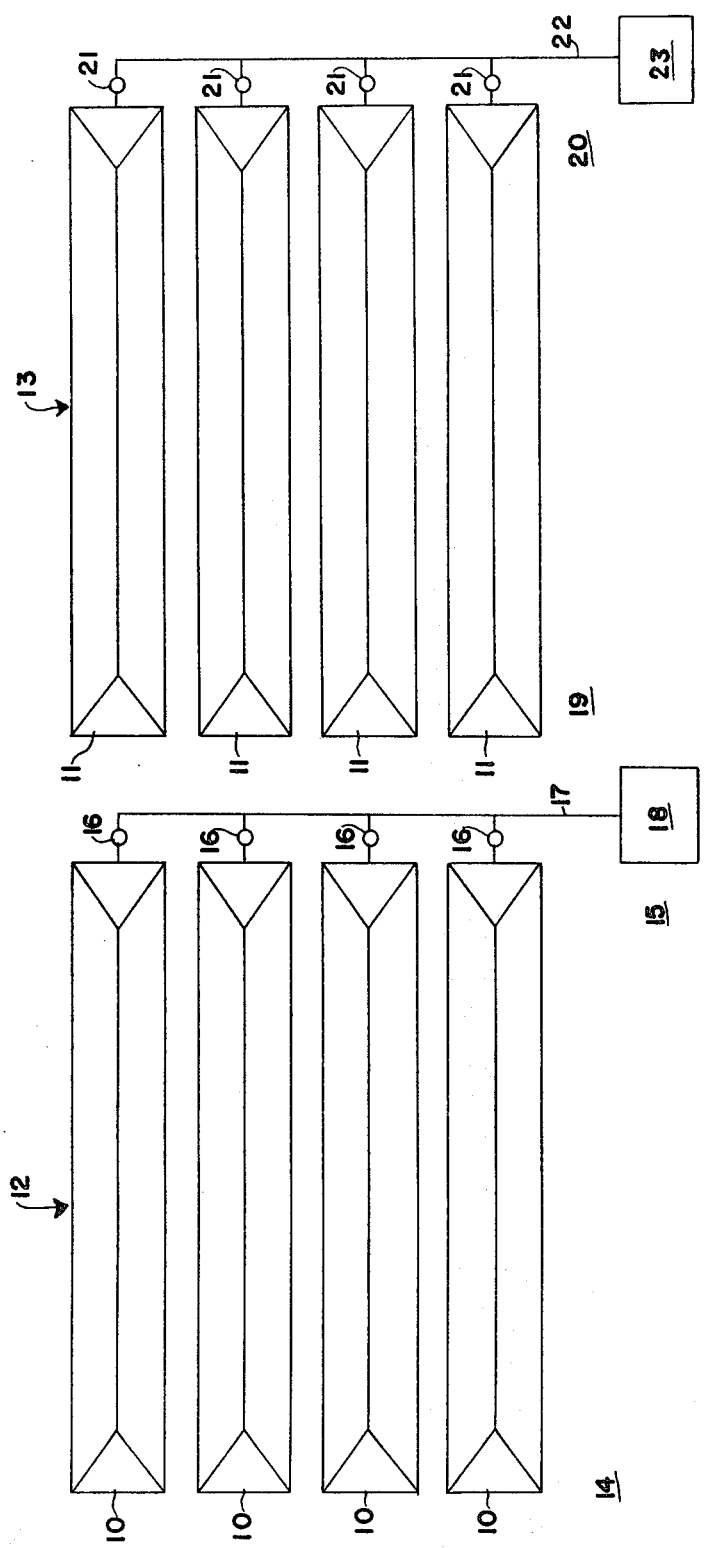
FIG. 1 is a plan view of multiple permanent waste disposal vaults aligned in parallel relation.
Figure 2:
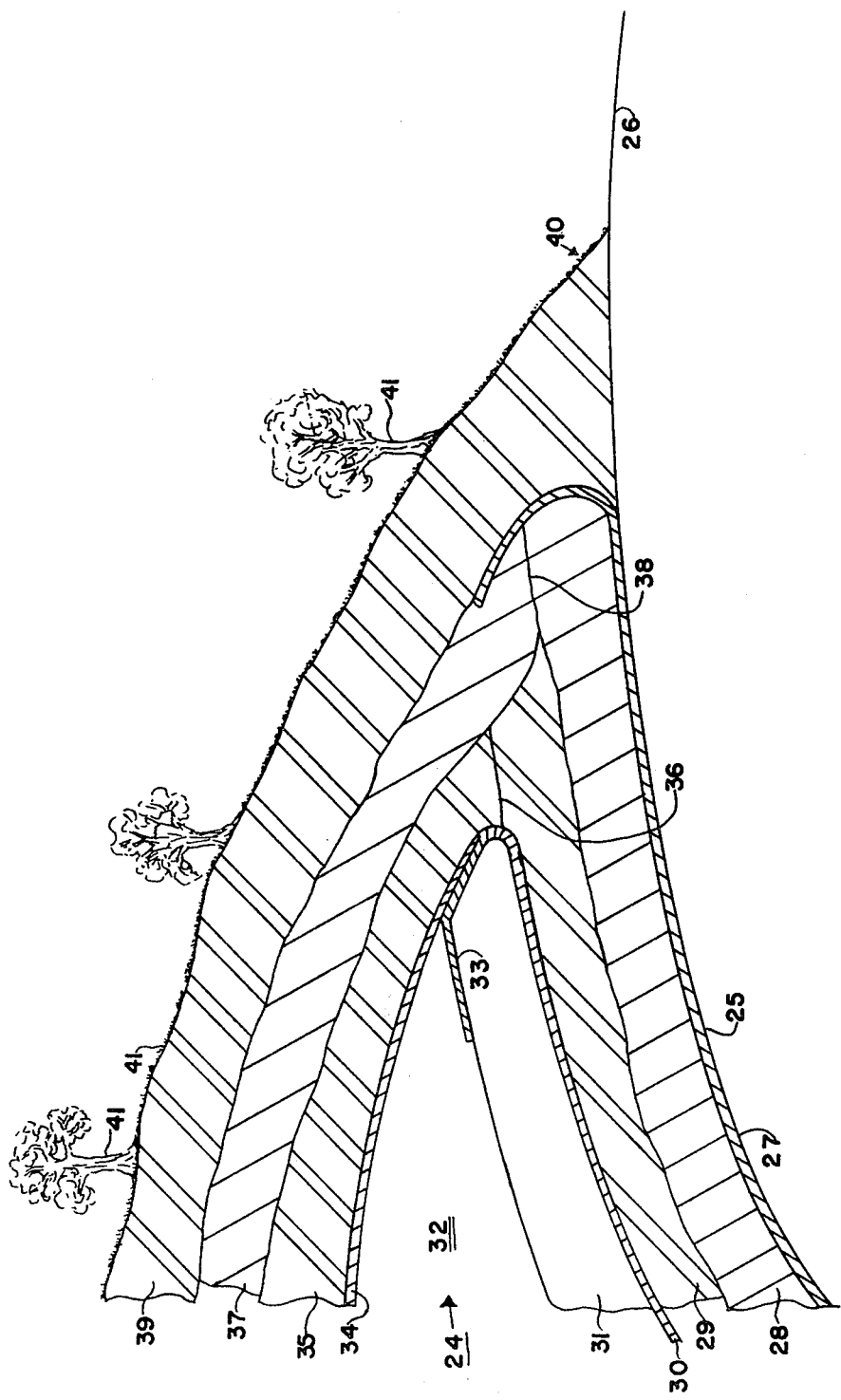
FIG. 2 is a cross-sectional view through a fragment of a typical waste disposal vault of the type illustrated in FIG. 1.

FIG. 1 illustrates a number of individual waste disposal vaults 10, 11 which are assembled in a first group 12 and a second group 13. Each of the individual waste disposal vaults 10, 11 is constructed in accordance with my copending patent application Ser. No. 201,498, aforesaid, which provides for encapsulation of the waste materials and further provides for a water-impermeable collection system as illustrated in FIG. 2. The group 12 of waste disposal base vaults is inclined from a high side 14 toward a low side 15 whereby leakage and leachate from any of the individual cells 10 may be accumulated in a sump 16. The collection system includes a manifold conduit 17 connected to a holding tank 18 for accumulating large quantities of leakage and leachate if they should materialize. Similarly the group 13 of waste disposal vaults 11 is inclined from a high side 19 toward a low side 20. Each of the waste disposal cells 11 has a sump 21 for the collection of leakage and leachate. A manifold conduit 22 is connected to a holding tank 23 for collection of large quantities of leachate or leakage should they materialize.

Each of the individual waste disposal vaults, illustrated in FIG. 2, is retained upon a water-impermeable basin as will be described in connection with FIG. 2. As shown in FIG. 2, a typical waste disposal vault 24 is provided in a basin 25 which slopes from the existing terrain 26 downwardly to a central collection zone which is not shown in FIG. 2. A water-impermeable barrier 27 is applied over the surface of the basin 25. Indigenous earth material or loose filler is applied on top of the water-impermeable barrier 27 as a water-permeable layer 28. Thereafter a water-impermeable layer of cementitious material 29 is applied on top of the water-permeable layer 28 and a water-impermeable film 30 is applied on top of the water-impermeable cementitious layer 29. A further layer of water-permeable material 31 such as indigenous soil material, slag, gravel, etc., is applied on top of the water-impermeable film 30 for protection of the film. The hazardous waste materials 32 are applied on top of the water-permeable layer 31 until the vault 24 is filled to the satisfaction of the vault operator. Thereafter the peripheral edges 33 of the water-permeable film 30 are folded above the perimeter of the water-permeable layer 31. A covering water-impermeable film 34 is applied on top of the hazardous waste materials 32 and is sealed around its perimeter to the water-impermeable film 30. Thereafter a water-impermeable cementitious layer 35 is applied on top of the water-impermeable film 34 and is secured at its outward edges, along a junction surface 36, to the perimeter of the cementitious water-impermeable layer 29. Thereafter a further layer 37 of water-permeable indigenous soil material, gravel, slag, or other available water-permeable material is applied on top of the water-impermeable layer 35 and connected along an outer surface 38 to the perimeter of the water-permeable layer 28.

Finally, a covering layer 39 of inert covering materials, preferably indigenous soil material, such as topsoil, is applied on top of the entire vault 24 above the water-permeable layer 37. The perimeter of the water-permeable layer 39 is shaped to conform with the contour of the region 26 at the intersection area 40. Vegetation 41 is planted on the exposed surface of the top layer 39.

It will be observed that, as shown in FIG. 2, the hazardous waste materials 32 are doubly encapsulated, firstly, by means of the water-impervious films 30, 34 and, secondly, by the cementitious water-impervious layers 29, 35. The entire waste disposal vault 24 is positioned above the normal high water table level in the region. The entire vault basin is lined with a water-impervious barrier 27 which serves to collect any liquid leakage or leachate which may materialize at any time from the waste disposal vault 24.

Figures 4, 5:
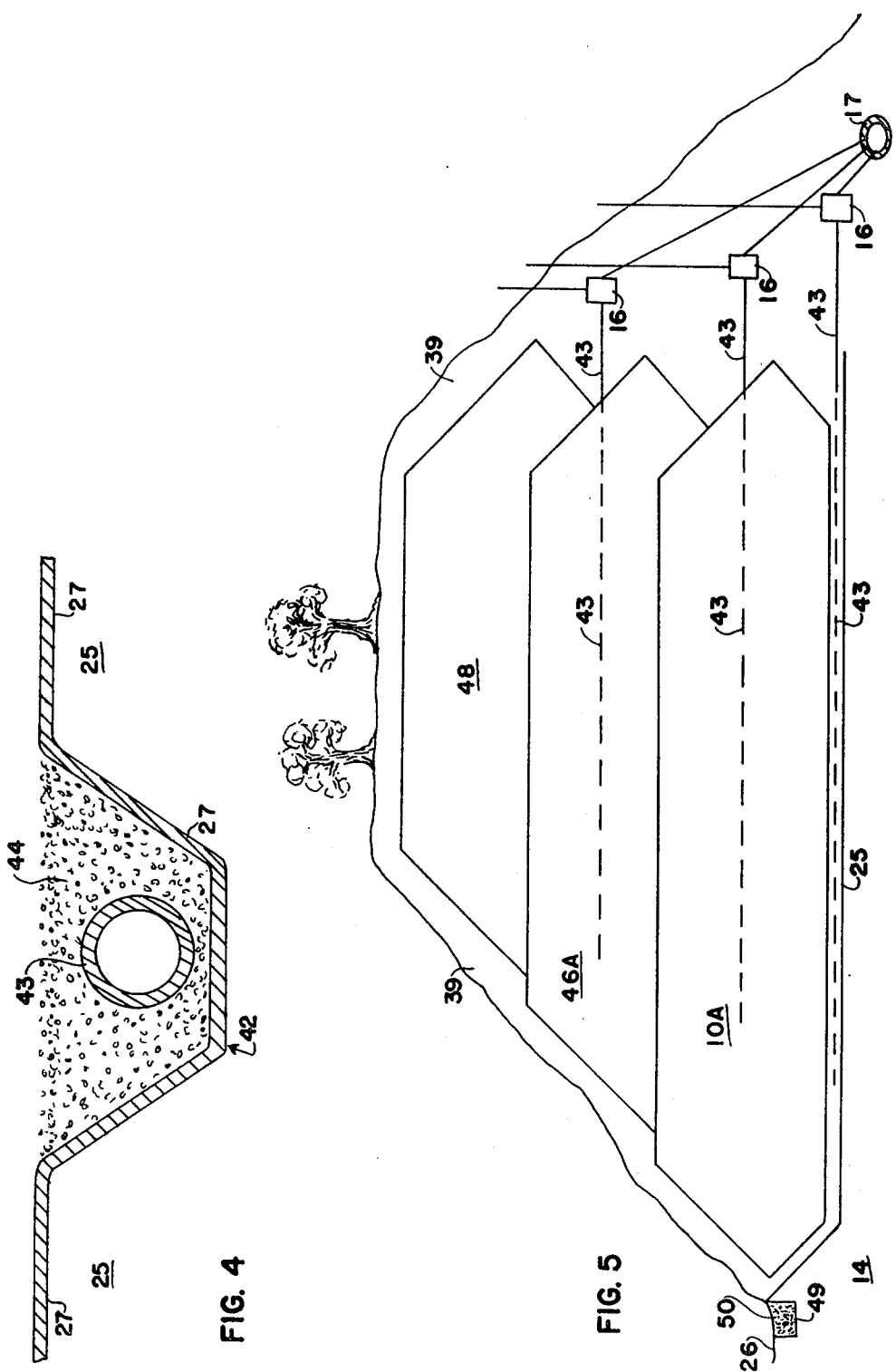
FIG. 4 is a cross-sectional view of a liquid collection element for each of the waste disposal vaults.
FIG. 5 is a side elevation view of the multiple waste disposal vaults of FIG. 3.

As shown in FIG. 4, the basin 25 may have a trench 42 at the lowest level throughout the length of the basin. The trench 42 is lined with the water-impervious barrier 27. A perforated conduit 43 is positioned within the trench 42 and is surrounded with porous, water-permeable filler materials 44 such as gravel, slag and the like. The conduit 43 will deliver any accumulated leakage or leachate from the basin 25 outwardly into the sumps 16, 21 which were shown in FIG. 1. The leakage or leachate can be accumulated within the sumps 16, 21 for analysis to determine the nature and magnitude of any fractures or failures within the waste disposal vault.

Figure 3:
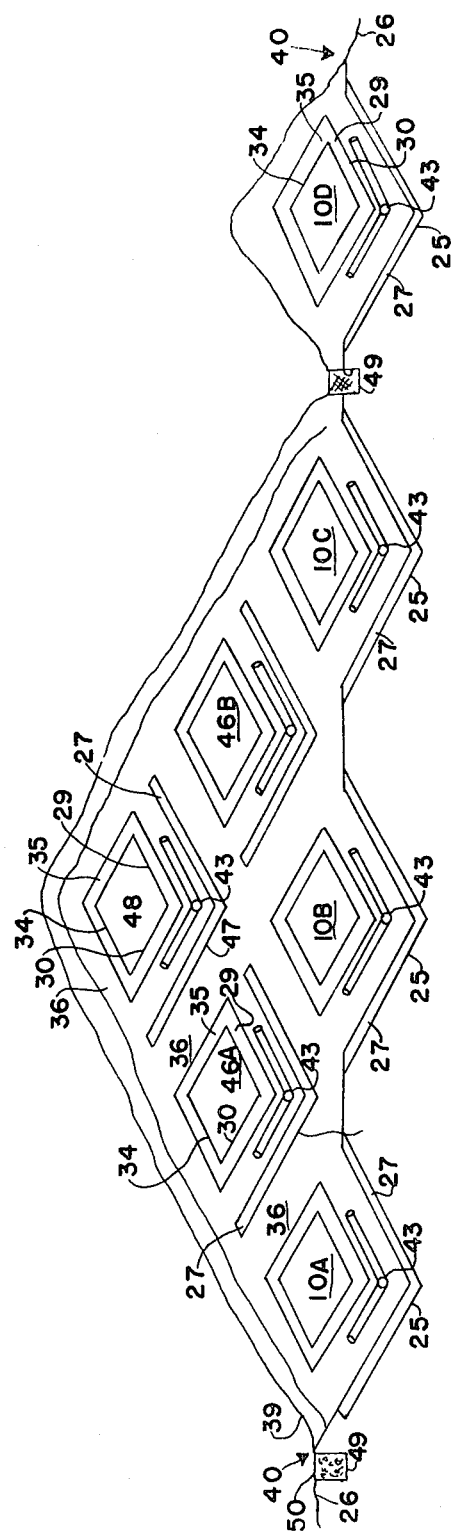
FIG. 3 is a cross-sectional view of an assembly of waste disposal vaults in accordance with the present invention.

In order to compact the waste disposal facilities, the present invention provides for stacking individual waste disposal vaults as shown in FIG. 3. Referring to FIG. 3, there are illustrated four parallel waste disposal base vaults 10 as shown in FIG. 1. Each of the waste disposal vaults 10 has its individual basin 25 which is lined with a water-impervious barrier 27, equipped with a collection conduit 43 and encapsulated with water-impermeable layers 29, 35 and water-impervious films 30, 34.

Referring to the parallel waste disposal base vaults 10A, 10B, it will be observed that their confronting slopes converge downwardly and can serve as a basin 45 for a second tier waste disposal vault 46A which is constructed in all other respects in the manner of the waste disposal base vaults 10. That is, the second tier waste disposal vault 46A includes a water-impervious barrier 27 which lines the basin 45; a collection conduit 43; cementitious water-impermeable layers 29, 34; and a water-impervious film 30, 34.

A water-permeable layer 36 is applied on top of the waste disposal vaults 10A, 10B to form the basin 45. In this stacking construction, it is not necessary to include the topsoil layer 39 in the space between the supporting waste disposal vaults 10A, 10B and the second tier waste disposal vault 46A.

Similarly, an additional second tier waste disposal vault 46B can be assembled in the space above the waste disposal base vaults 10B, 10C.

It will be observed that the confronting slopes of the second tier waste disposal vaults 46A, 46B converge downwardly to define a basin 47 in which a third tier waste disposal vault 48 may be installed. The third tier waste disposal vault is constructed similarly to the other waste disposal vaults. That is, the third tier waste disposal vault includes a water-impervious barrier 27 for the basin 47 and liquid collection means 43 for leakage and leachate; water-impermeable layers 29, 36 and water-impervious films 30, 34. The water-permeable layer 36 is provided above the water-impermeable layer 35 and also serves to define the basin 47 above the second tier cells 46A, 46B.

The topsoil layer 39 is applied over the stacked waste disposal vaults 10A, 46A, 48, 46B, 10C.

As the waste disposal facility continues its lifetime, additional waste disposal vaults may be provided as second tier vaults above the base vaults 10C, 10D. Additional third tier vaults may be introduced. Fourth tier and additional waste disposal vaults may be provided.

Referring to FIG. 3, it will be observed that, during the active operations in the waste disposal facility, it may be desirable to provide a lined drainage ditch 49 in the furrow between the waste disposal vaults 10C, 10D to collect and divert surface water. It should be observed that the surface water collected in the drainage ditch 49 will not contain contamination from the waste materials because the surface water should not come into contact with the waste materials.

By positioning the entire waste disposal facility above the normal high water table level in the region, there should be no opportunity for the accumulated waste materials within the waste disposal vaults to become saturated with moisture. Any drainage from any of the waste disposal vaults will be accumulated in the basin for that vault and thence in the related sump whence it can be analyzed.

In a preferred installation, the waste disposal facility operator will maintain an inventory of the identification of waste materials in each of the individual waste disposal vaults and in each portion of the individual waste disposal vaults. Thus, if the leakage or leachate in one of the collection sumps shows a presence of chromium ions, the operator can review his inventory to determine the location of chromium waste deposits in the particular waste disposal vault and can investigate the geological conditions of the particular vault at that region and can carry out appropriate repairs.

Prior to completion of the repairs, the accumulated leakage and leachate will be diverted to a collection tank 18, 23 (FIG. 1) for accumulation and safe disposal.

As shown in FIG. 5, the waste disposal vaults 48, 46A, 10A will be offset at the high end 14 of the existing terrain 26 whereby surface water will flow away from the waste disposal vaults. Each of the moisture collection conduits 43 has its own sump 16 which is positioned within the corresponding vault basin. Each of the collection conduits 43 is connected to the manifold conduit 17 for collecting substantial quantities of leakage and leachate should they materialize.

It may be desirable to provide a drainage ditch 49, lined with a water-impervious film and filled with water-permeable materials such as gravel or slag to divert surface waters around the waste disposal facility as shown in FIG. 5 and FIG. 3.

The water-impermeable material described herein as the layer 29, 35 (FIG. 2) preferably is cementitious and preferably is produced situ by combining three ingredients: a cementitious additive such as portland cement, inert fillers such as indigenous earth materials (stone, gravel, clay, sand, rocks, soil) and moisture containing material such as water, aqueous slurries containing suspended finely divided solids, or semi-liquid sludges. The three ingredients are applied to the surface where the cementitious layer is to be located and are mixed in situ by appropriate mechanical mixing devices such as an agricultural disc harrow. The preparation of cementitious layers in this fashion is described in co-pending U.S. patent application Ser. No. 165,280 filed July 2, 1980, and assigned to the assignee of the present application. In addition to portland cement as the cementitious ingredient of the cementitious additive, it is possible to use calcium oxide, calcium oxide and fly ash, calcium sulfate hemi-hydrate, anhydrous calcium sulfite, slag, other hydraulic cements. An inert particulate filler which is useful in preparing the cementitious layer is fly ash obtained from industrial processes. In general, the cementitious layers of the permanent vaults are from 6 to 18 inches thick, preferably about 12 inches thick.

The water-impervious barrier (FIG. 2) is employed in FIG. 2 as a basin liner barrier 27, and as an encapsulating barrier 30, 34. These water-impervious barriers or films are continuous and are formed from materials which will not soften, extract, dissolve or deteriorate. Such barriers may be preformed films of polyethylene polypropylene, polyethylene terephtholate polyvinyl chloride, polyvinyl fluoride or sprayed-on organic material such as asphalt. If the hazardous chemical waste contains organic contaminants which might cause deterioration of an organic film, then the basin liner barrier 27 should be a water-impermeable layer, 6 to 12 inches thick of suitable cementitious substances as herein described.

We claim:

1. A permanent waste disposal installation comprising a group of multiple disposal vaults positioned above the normal high water table level of a region;

at least two parallel, spaced-apart base vaults, each having a basin with a lengthwise slope from a high end toward a low end and having a channel shape from side to side, with the sides of the basins of all of the parallel base vaults being substantially parallel;

an intermediate vault positioned between adjacent base vaults and having a basin with a lengthwise slope from the same high end toward the same low end and having a channel shape from side to side;

each of said vaults having a water-impermeable encapsulation and being positioned above a distinct water-impervious barrier, a collection conduit beneath each said encapsulation and above the said distinct water-impervious barrier, said conduit extending beyond the said lower end of its respective basin; the said collection conduit for the said intermediate vault being aligned between the adjacent sides of the said adjacent base vaults;

said group of multiple disposal vaults being covered with inert covering materials which are graded to correspond to the contour of the region;

means for accumulating leakage and leachate from each said collection conduit.

2. A permanent waste disposal installation including two separate waste disposal installations according to claim 1 and wherein the said means for accumulating leakage and leachate serves both separate waste disposal installations.

3. A permanent waste disposal installation according to claim 1 wherein said two parallel, spaced-apart base vaults are covered with a water impermeable layer which defines a valley between the said two vaults; and said valley defines the said basin of said intermediate vault.

4. A permanent waste disposal installation according to claim 1 wherein a drainage ditch is provided around at least a portion of the perimeter of said base vaults to divert surface water around said waste disposal installation.

5. A waste disposal installation according to claim 1 wherein the said water-impervious barrier is a preformed film of water impervious plastic substances.

6. A waste disposal installation according to claim 1 wherein said water impervious barrier is a sprayed on coating of asphaltic material.

7. A waste disposal installation according to claim 1 wherein acid water-impervious barrier is a layer of cementitious material at least six inches thick.

8. A waste disposal installation according to claim 1 wherein said cementitious material is a mixture of portland cement and inert fillers.

* * * * *